April 8, 1969  K. T. OVERMAN  3,437,470
CONSTANT FORCE INTERNAL SUPPORT FOR GLASS OVERFLOW WEDGE
Filed June 17, 1966  Sheet 1 of 3
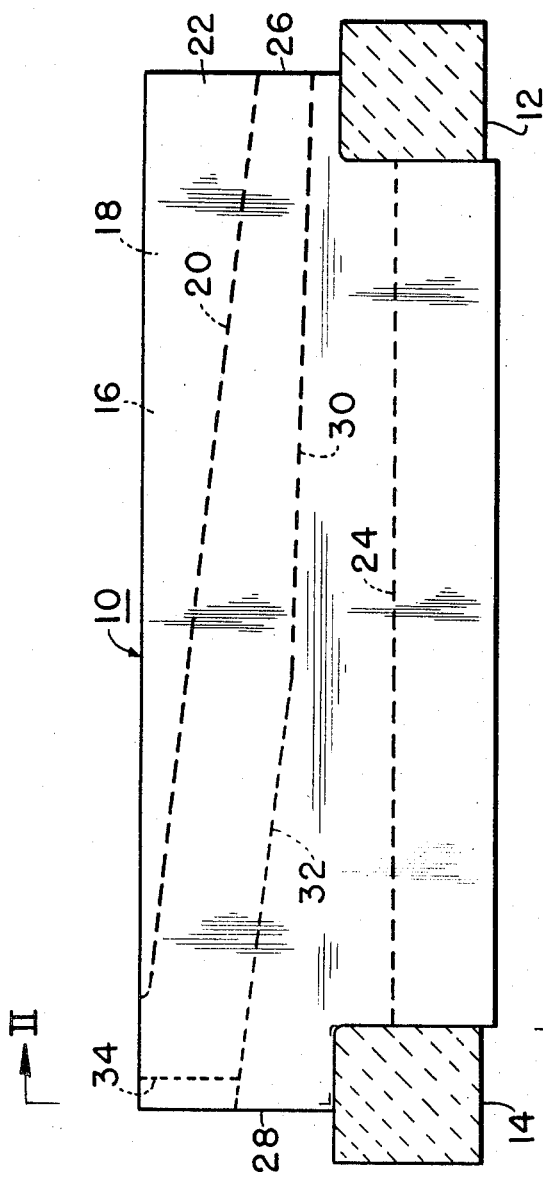
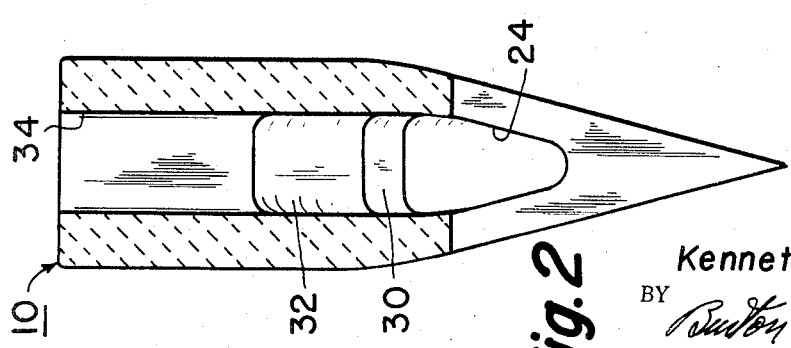
INVENTOR.
Kenneth T. Overman
BY
ATTORNEY INVENTOR.
Kenneth T. Overman United States Patent Office 3,437,470
Patented Apr. 8, 1969

3,437,470
CONSTANT FORCE INTERNAL SUPPORT FOR GLASS OVERFLOW WEDGE
Kenneth T. Overman, Painted Post, N.Y., assignor to Corning Glass Works, Corning, N.Y., a corporation of New York
Filed June 17, 1966, Ser. No. 558,483
Int. Cl. C03b *15/02*
U.S. Cl. 65—195                    7 Claims This invention relates to the manufacture of sheet glass, and more particularly to an improved method of and means for internally supporting central portions of an overflow wedge or trough utilized in the downdraw sheet glass manufacturing process.

In manufacturing sheet glass by the downdraw process, molten glass is fed to a forming wedge having an upwardly-open trough and a pair of downwardly converging forming surfaces. The glass entering the trough overflows opposite sides thereof and flows downwardly along the converging forming surfaces to the lower root or apex of the forming wedge, wherein the separate flows unite to form sheet glass having improved surface quality. The maximum width of sheet glass which can be produced by this method is, however, limited by the length of the forming wedge.

In view of the fact that the forming wedge is continuously subjected to extremely high temperatures, such as are required to maintain glass in a molten condition, it is necessary that it be formed of a refractory material. However, even refractory materials have limited structural strength at these temperatures, and further, due to the nature of the downdraw glass manufacturing process it is impossible to externally support the forming wedge except at its ends. Accordingly, the weight of the refractory and the molten glass flowing thereover creates a large bending moment in the center portion thereof, thus producing undesirable tensile stresses along under surfaces of the forming wedge which may cause refractory failure and complete collapse of the forming unit.

It has been known in the past that the maximum width of sheet which could be drawn was limited by the longitudinal span or length of the forming wedge, which in turn had a practical limitation with respect to adequate structural support. Since stresses within a span supported only at its ends increase as the length of the span increases, it became apparent that without the utilization of additional internal support, the limit of obtainable sheet width would be predicated upon the maximum strength obtainable from the refractory material used in the forming wedge. Therefore, as shown in the prior art patents to Allen 1,772,448 and Ferngren 1,829,641, it has been known in the art to utilize a rigidly mounted internal support member to provide the extra support necessary for producing commercial width sheet.

The use of a rigidly mounted internal support member, however, has not been completely satisfactory due to the variable deformation and sagging rates exhibited by the metallic support members and the refractory forming wedges. When the metallic support member is actually embedded within the refractory forming wedge, as shown in the above cited patents to Allen and Ferngren, differential expansion rates, deformation rates, and sagging rates between the metal support member and the refractory forming wedge, may actually cause the forming wedge to spall and crack resulting in ultimate failure. In addition, the amount of support provided by the rigidly mounted metal internal support bar will vary greatly with time, since its supporting value depends upon the relative sagging rates of the refractory forming wedge and the metal supporting member. It thus can be seen that the prior art internal support devices not only fail to provide a known value of supporting force, but also fail to provide a constant supporting force at a given desired area irrespective of the relative deformation and sagging rates of the refractory forming wedge and its internal metallic support member which may be occasioned due to time and temperature of usage.

The present invention obviates the problems heretofore encountered in supporting central portions of a longitudinally-extending refractory forming wedge utilized to produce sheet glass. An internal support bar is positioned through a contoured longitudinally-extending hole or recess formed in the forming wedge, with one end of such bar resting upon a rigid support, and the opposite end movably supported with a predetermined lifting force. The longitudinal hole is contoured not only so that the internal support bar exerts an upward force in a longitudinally-central portion of the forming wedge, but also so that the end of the bar which is movably supported with a constant predetermined force is in spaced relation from the forming wedge to compensate for differential deformation or sagging which may be experienced by the support bar. By rigidly supporting both ends of the forming wedge and utilizing such an internal support means, it is possible to maintain a constant and controllable upward force at a central portion of the forming wedge irrespective of the relative deformation and sagging rates of the refractory forming wedge and the support bar.

It thus has been an object of the invention to obviate the problems heretofore encountered with rigid support structures for forming wedges utilized to produce sheet glass by the downdraw process.

A further object of the invention has been to provide a novel support structure for forming wedges which provide a constant predetermined supporting force irrespective of differential sagging and deformation rates which may be occasioned between a refractory forming wedge and a metal support bar.

An additional object of the invention has been to provide a novel method of controlling the value of supporting forces exerted upon a central portion of an end-supported longitudinally-extending beam.

These and other objects of the invention will become more apparent to those skilled in the art from the following disclosure and accompanying drawings in which:

FIG. 1 is a side elevational view of a single-end-feed refractory overflow trough or forming wedge utilized in the downdraw process of sheet glass.

FIG. 2 is an elevational view in section taken along line II—II of FIG. 1, but twice the scale of FIG. 1.

Figure 3:
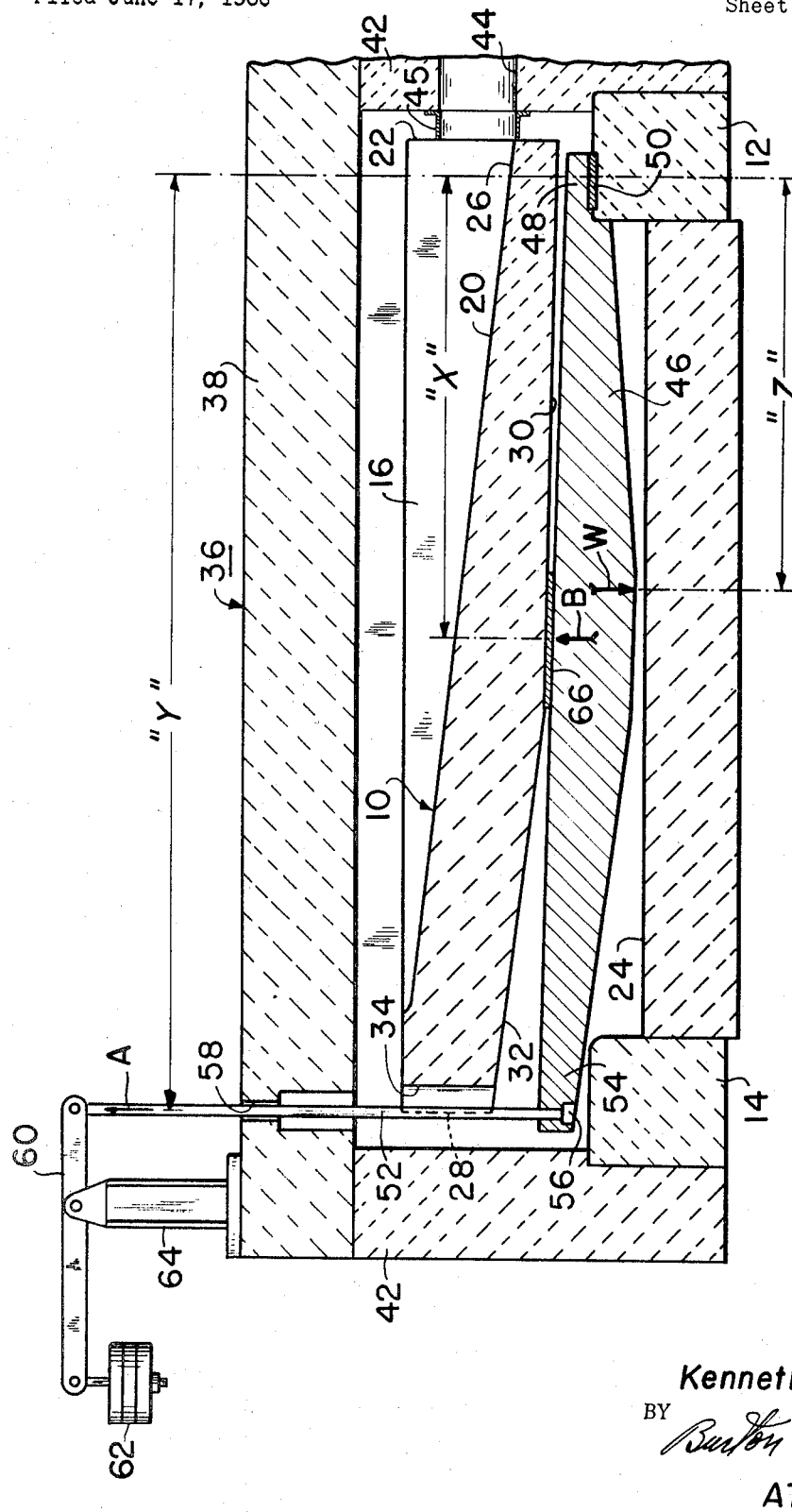
FIG. 3 is a side elevational view in section of the forming wedge and on the scale shown in FIG. 1, positioned within an enclosing muffle and having an internal support structure embodying the present invention associated therewith.

Referring now particularly to FIGURES 1 and 2, a refractory forming wedge or overflow trough 10 is shown supported at its opposite ends by suitable refractory support blocks or piers 12 and 14. The forming wedge 10 is provided with an upwardly open channel 16 bounded by a pair of sidewalls 18 and an inclined bottom surface 20. In addition, the channel 16 is provided with an inlet or feed entrance opening 22 adjacent one end of the overflow trough.

A contoured opening or hole 24 extends longitudinally through the forming wedge 10 for receiving an internal support member. The longitudinally extending hole 24 communicates with both an open or inlet end 26 of the overflow trough, as represented by feed entrance 22, and an opposite closed end 28 of the trough, adjacent which end the channel 16 terminates. The contoured opening 24 is provided with a roof 30 having a recessed or tapered portion 32 adjacent the closed end 28 of the forming wedge. A vertically extending recess 34 may be formed in the closed end 28 of the forming wedge 10 which communicates between the longitudinally-extending hole 24 and the upper surface of the wedge.

Figure 4:
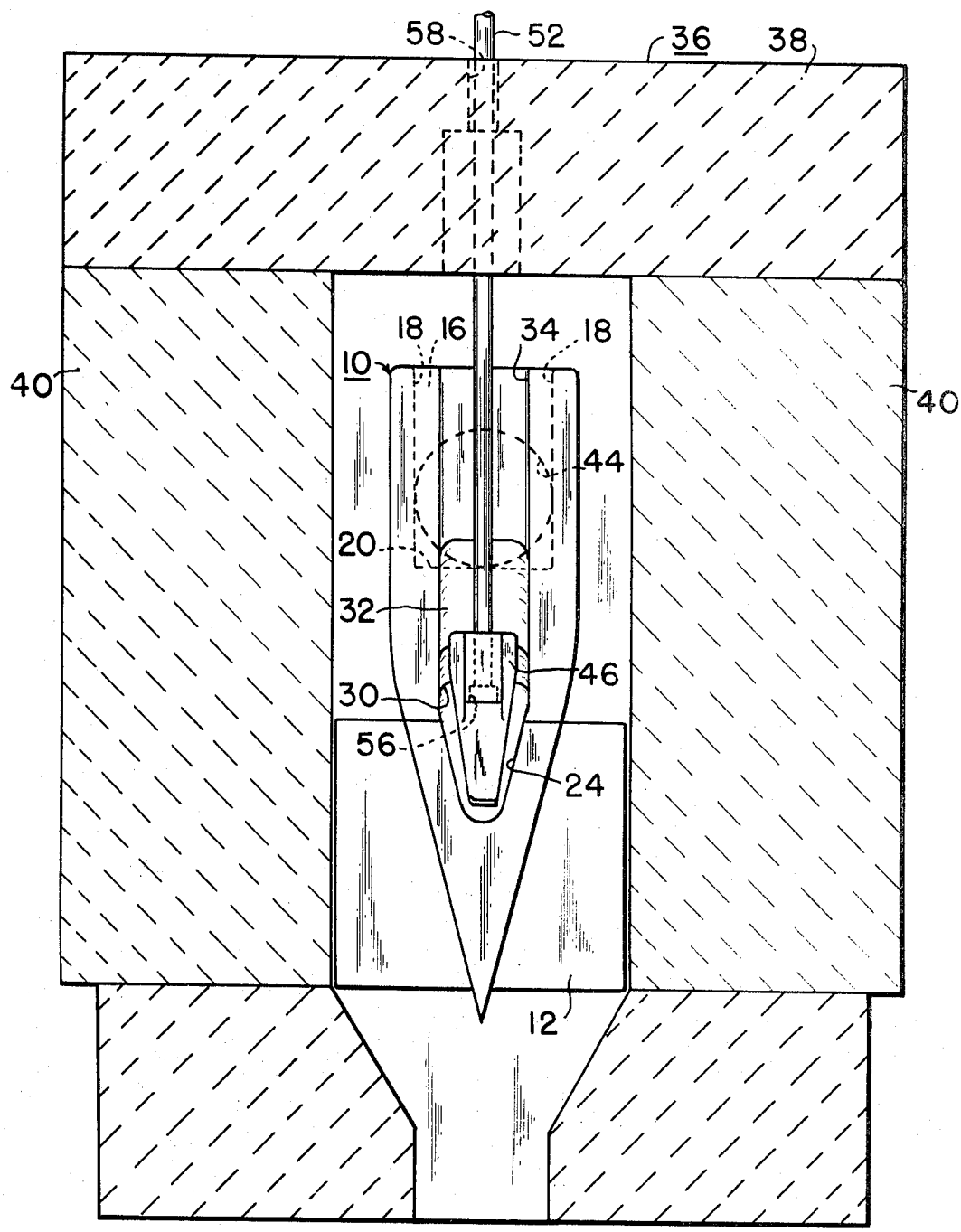
FIG. 4 is an elevational view on the scale of FIG. 2, taken inside of the muffle assembly, of the left end of the forming wedge and its supporting structure as viewed in FIG. 3.

Referring now to FIGURES 3 and 4, the refractory forming wedge or overflow trough 10 is shown positioned within a refractory muffle or housing 36 having a top wall 38, sidewalls 40, and end walls 42. As shown, one end wall is provided with inlet passage 44 having a flanged adaptor extension 45 which communicates with the inlet or feed entrance 22 of upwardly open channel 16. A support bar or member 46 is positioned within the contoured hole 24, and has a flanged portion 48 at one end which rests upon rigid support block 12. A load-bearing intermediate density refractory pad 50 may be positioned between the flange portion 48 and support block 12 to distribute the load over the entire contacting surface of flange 48 and thereby protect the support bar from possible fracture due to point loading.

The opposite end of the support bar 46 is movably supported with a predetermined upward force, such as by means of a hanger rod 52 pendently suspending end 54 of support bar 46 by means of a recessed head portion 56. The rod 52 is shown extending upwardly in recess 34 of wedge 10 and through an opening 58 in top wall 38, and is suitably connected to one end of a pivot arm 60 having adjustable weights 62 suspended from the opposite end. Arm 60 is shown pivotally mounted upon a support 64. A refractory pad 66, such as an intermediate density zirconium material, is positioned between the roof 30 of the contoured opening 24 and the support member 46 to distribute a constant predetermined supporting load longitudinally-centrally of the refractory forming wedge 10. If desired, the support bar member 46 may extend outwardly beyond the closed end 28, and accordingly recess 34 would not be necessary.

Although the forming wedge 10 is supported at its open end 26 and closed end 28 by means of support blocks or piers 12, 14 respectively, it is necessary to provide a constant predetermined upward supporting force centrally of the longitudinal span of the forming wedge so as to insure against refractory failure during the glass forming operation. A predetermined upward force A, provided along the axis of hanger rod 52, is supplied to the suspended end 54 of support bar 46 by adjusting the weights 62 suspended on pivot arm 60. The force A applied to hanger rod 52 results in a support force B on the refractory trough or forming wedge 10 in the center of its longitudinal span. The refractory pad 66 distributes the supporting force thereby reducing the maximum stress to a safe level in the refractory wedge. The upward force B is predetermined by the amount of weights 62 suspended on pivot arm 60, taking into consideration the mass of the refractory forming wedge itself together with the weight of the molten glass supported thereby and the weight W of support bar 46.

Since the end 54 of the support bar 46 is actually suspended with a predetermined upward force A, the supporting force B will remain constant regardless of relative sagging rates and deformation of the refractory trough and support bar. Such uniformity of force application is necessary to provide operative results, since too large of an upward force would tend to produce excessive tensile stresses in the top of the forming wedge, whereas too low of a force would permit excessive stresses to be created along the bottom surface of the wedge resulting in ultimate refractory failure. It should be noted, that the recessed or tapered roof portion 32 of the contoured opening or hole 24 permits the support bar 46 to differentially deform or sag under the extreme temperatures to which it is subjected during the glass forming operation, without detrimentally affecting the supporting force B.

That is, since the end 54 is suspended in spaced-apart relation from the tapered roof portion 32, the suspended end 54 of the support bar 46 may deform, within reasonable limits, and still provide the same uniform predetermined support force B centrally of the longitudinal extent of the forming wedge.

Referring particularly to FIGURE 3, it can be seen that the suspended support arrangement embodying the present invention provides a centrally applied upward supporting force B which is proportional to the suspension force A applied to the suspended end 54 of the support 46. As shown, the distance Y is equal to the effective suspended length of the support bar 46, whereas the distance X is equal to the lever arm between the mean of supported flange portion 48 and the centrally applied support force B. Further, the distance Z is equal to the distance between the mean of supported flange portion 48 and the center of the mass of support bar 46. Accordingly, it is possible to apply a controlled uniform predetermined supporting force to the forming wedge centrally of its longitudinal span in accordance with the following equation:

$$F_b = F_a\left(\frac{Y}{X}\right) - W\left(\frac{Z}{X}\right)$$

Wherein $F_b$ is equal to the centrally applied upward supporting force at B; $F_a$ is equal to the upward suspending force applied at A; W is equal to the weight of the supporting bar or member 46; Y and X are the effective lever arms of the upward forces applied at A and B respectively, from the supported end 48 of the support bar 46; and Z is the effective lever arm of the downward force W at the center of mass of bar 46 from the supported end 48.

Since both the weight W of the support bar 46 and the distances Y, X and Z are known, the amount of centrally applied supporting force $F_b$ can readily be controlled by applying a desired predetermined suspending force $F_a$ by means of weights 62. It is of course within the scope of the invention to apply a constant force $F_a$ at A in any desired manner, such as by means of a lever and weights as shown, or alternatively, pulley and weights, or by an adjustable spring arrangement, or a push rod up through the bottom of the muffle housing rather than the pull rod through the top thereof, or by the use of a calibrated air or hydraulic cylinder device. As the support bar 46 slowly deforms under the effects of high operating temperatures and loads produced by forces $F_a$ and $F_b$, the suspended end 54 of the bar 46 has a tendency to slowly move upwardly within the recessed area provided by tapered portion 32, so as to maintain a constant and controllable supporting force $F_b$ at B.

The support bar or member 46 and the hanger rod 52 may be made of any suitable material such as stainless steel or platinum clad molybdenum. In addition the high strength refractory materials such as titanium, columbium, or titanium-zirconium - molybdenum aloys may be utilized.

Although the now preferred embodiment of the invention has been set forth in detail, it will be apparent to those skilled in the art that various changes and modifications may be made thereto without departing from the spirit and scope of the invention as defined in the appended claims.

I claim:

1. In apparatus for forming sheet glass wherein a longitudinally-extending refractory forming wedge member having an opening extending longitudinally therethrough is rigidly supported at its opposite ends to facilitate the unobstructed flow of molten glass downwardly along opposite sides of such member, the improvement comprising an internal support bar member positioned within said longitudinally-extending opening for providing an upward supporting force centrally of the longitudinal extent of said forming wedge, and means for maintaining a constant predetermined supporting force substantially centrally of the longitudinal extent of said forming wedge irrespective of differential deformation and sagging rates between the refractory forming wedge and the support bar.

2. Apparatus as defined in claim 1 wherein substantially rigid means supports one end of said support bar member and means pendently support the opposite end with a desired predetermined upward force.

3. Apparatus as defined in claim 1 including means suspending one end of said internal support bar with a constant predetermined upward force, and means for distributing a resultant supporting force centrally of the span of said forming wedge member.

4. Apparatus as defined in claim 3 including adjustable weight means pivotally suspending said one end of the support bar with a predetermined force irrespective of the sagging and deformation rates of the forming wedge and support bar, and said longitudinally-extending hole having a recessed portion in the roof thereof adjacent the suspended end of said support bar, within which said bar may deform without affecting the constant predetermined supporting force applied centrally of the span of the forming wedge.

5. Apparatus as defined in claim 1 wherein a substantially rigid member supports one end of said internal support member and means movably support the opposite end with a predetermined upward force, and said internal support member provides a controlled predetermined upward force centrally of the longitudinal span of said forming wedge wherein such force is derived from the following equation:

$$F_b = F_a\left(\frac{Y}{X}\right) - W\left(\frac{Z}{X}\right)$$

wherein $F_b$ is equal to the supporting force applied centrally of the span of the forming wedge; $F_a$ is equal to the upward force applied to the movable end of the support member; $W$ is the mass weight of the support member; $Y$ is the effective lever arm between the force $F_a$ and the rigidly supported end of the support member; $X$ is the effective lever arm between the force $F_b$ and the rigidly supported end of the support member; and $Z$ is the effective lever arm between the center of mass $W$ and the rigidly supported end of the support member.

6. Apparatus as defined in claim 1 wherein one end of said internal support bar rests upon a rigid support member, an upwardly-extending rod is suitably secured at its lower end to the opposite end of said support bar, a pivot arm is operatively connected to an upper end of said rod, and a plurality of adjustable weight means are suspended from an outer end of said pivot arm to suspend said opposite end of said support bar with a predetermined constant upward force.

7. Apparatus as defined in claim 6 wherein a roof portion of said longitudinally-extending opening formed in said forming wedge is provided with a tapered recessed portion to permit deformation of said support bar without affecting the constant predetermined supporting force supplied thereby to said forming wedge.

References Cited

UNITED STATES PATENTS

| | | | |
|---|---|---|---|
| 1,548,444 | 8/1925 | Corl | 65—99 |
| 1,646,705 | 10/1927 | Peiler | 65—164 |
| 1,673,907 | 6/1928 | Ferngren | 65—195 X |
| 3,338,696 | 8/1967 | Dockerty | 65—324 X |

DONALL H. SYLVESTER, *Primary Examiner.*

ARTHUR D. KELLOGG, *Assistant Examiner.*

U.S. Cl. X.R.

65—121, 132, 164, 324, 333, 341